United States Patent [19]
Hinchliffe et al.

[11] Patent Number: 5,948,228
[45] Date of Patent: Sep. 7, 1999

[54] METHOD OF FABRICATING A CHANNEL MEMBER FOR A PALC DISPLAY PANEL

[75] Inventors: Robert D. Hinchliffe, Newberg, Oreg.; Mark W. Roberson, Cary, N.C.; Dorothy L. Blazo; Donald E. Kephart, both of Portland, Oreg.

[73] Assignee: Tektronix, Inc., Wilsonville, Oreg.

[21] Appl. No.: 08/925,691

[22] Filed: Sep. 9, 1997

Related U.S. Application Data

[60] Provisional application No. 60/028,201, Oct. 10, 1996.

[51] Int. Cl.$^6$ .............................. C08F 2/58; C23C 28/00; C23F 17/00; C25P 13/00
[52] U.S. Cl. ........................ 204/485; 204/490; 204/499; 445/50; 313/582
[58] Field of Search ..................................... 204/485, 490, 204/499; 205/122; 445/50; 313/582, 586

[56] References Cited

U.S. PATENT DOCUMENTS

| | | | |
|---|---|---|---|
| 5,762,773 | 6/1998 | Rasmussen | 204/485 |
| 5,783,906 | 7/1998 | Moore et al. | 313/586 |

*Primary Examiner*—Kathryn Gorgos
*Assistant Examiner*—Wesley A. Nicolas
*Attorney, Agent, or Firm*—John D. Winkelman; John Smith-Hill

[57] ABSTRACT

A method of fabricating a channel structure for a PALC display panel comprises providing a channel member having channels formed in its upper surface and two electrodes in each channel, masking one electrode in each channel while leaving the other electrode unmasked, depositing material on the unmasked electrode in each channel, and removing the mask from masked electrode in each channel.

8 Claims, 2 Drawing Sheets

5,948,228

METHOD OF FABRICATING A CHANNEL MEMBER FOR A PALC DISPLAY PANEL

CROSS REFERENCED TO RELATED APPLICATIONS

This application claims the benefit of U.S. Provisional Application No. 60/028,201, filed Oct. 10, 1996.

BACKGROUND OF THE INVENTION

This invention relates to method of fabricating a channel member for a plasma addressed liquid crystal (PALC) display panel.

U.S. Pat. No. 5,077,553 discloses apparatus for addressing data storage elements. A practical implementation of the apparatus shown in U.S. Pat. No. 5,077,553 is illustrated schematically in FIG. 4 of the accompanying drawings.

The display panel shown in FIG. 4 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 4), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

When the anode in one of the channels is connected to ground and a suitable negative voltage is applied to the cathode in that channel, the gas in the channel forms a plasma that provides a conductive path at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its, plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

There are three principal methods currently used for fabricating the channel member of a PALC display panel. In accordance with one method, a glass substrate is etched to form an array of parallel channels in its upper surface and the anodes and cathodes are then formed in the channels.

Another method involves depositing layers of paste on discrete areas of a glass substrate using a screen printing process.

The third method involves depositing blanket layers of material on a glass substrate and selectively removing the material by sandblasting.

The channel member 4 shown in FIG. 4 is formed using the first method described above. For ease of processing, the anodes of the channel member shown in FIG. 4 are formed at the same time as the cathodes and are of the same structure as the cathodes.

During operation of the PALC panel, the cathode is subject to sputtering by the positive ions of the plasma. It has been proposed that the cathode should be protected from sputtering damage by providing a protective top coating of refractory material over the cathode. See U.S. Pat. No. 5,783,906 and U.S. Provisional Patent Application No. 60/023,418 (Attorney Docket No. 5843-US-1). The coating of refractory material may be composed of a rare earth hexaboride, such as $LaB_6$, in which case the coating may be deposited by cataphoretic deposition.

It has also been suggested that it may be advantageous if the rare earth hexaboride is not deposited on the anodes and that the anodes should have a surface layer that is homogeneous and is of high electrical conductivity. See U.S. Provisional Patent Application No. 60/026,661 (Attorney Docket 6279-US-0), the disclosure of which is hereby incorporated by reference herein.

In accordance with the disclosure in U.S. Provisional Patent Application No. 60/026,661 (Attorney Docket 6279-US-0), it is proposed that the channel member should be placed in an electrophoresis deposition cell and that the cathodes be connected to the negative terminal of the cataphoretic deposition voltage source but that the anodes should remain out of circuit or be connected to a terminal at a positive voltage relative to the negative terminal of the cataphoretic deposition voltage source. The spacing between the anode and cathode in a channel of the channel member may be as small as 100 μm, and even though most of the rare earth hexaboride will be deposited on the cathodes, it is still possible that a significant quantity of the rare earth hexaboride will be deposited on the anodes.

SUMMARY OF THE INVENTION

In accordance the present invention there is provided a method of fabricating a channel structure for a PALC panel, comprising providing a channel member having a plurality of channels formed in its upper surface and having at least two electrodes in each channel, each electrode having an exposed surface, masking the exposed surface of at least one electrode in each channel while leaving the exposed surface of at least one other electrode unmasked, depositing material on the exposed surface of said other electrode in each channel, and removing the mask from said one electrode in each channel.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to designate corresponding components.

DETAILED DESCRIPTION

Figure 1:
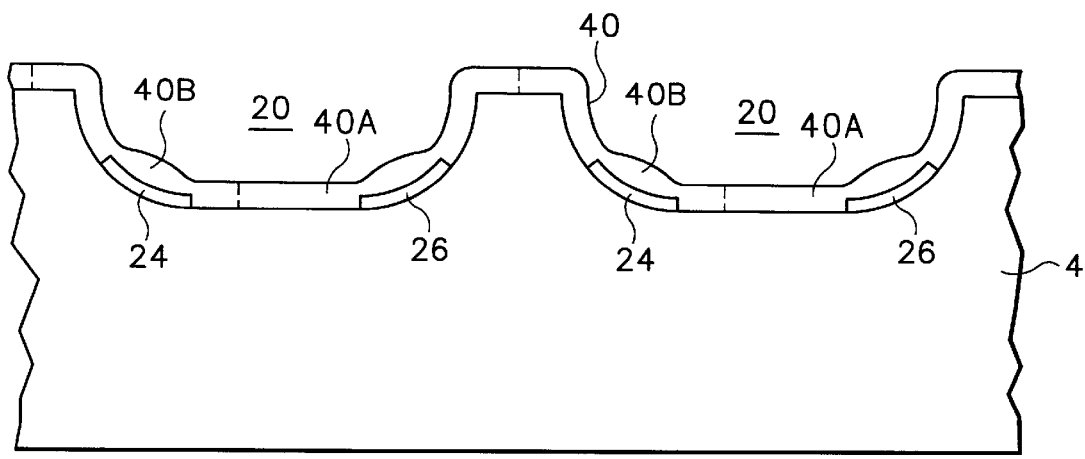
FIGS. 1, 2 and 3 illustrate respective steps in fabrication of a channel structure for a PALC display panel by a method in accordance with the present invention.
Figure 2:
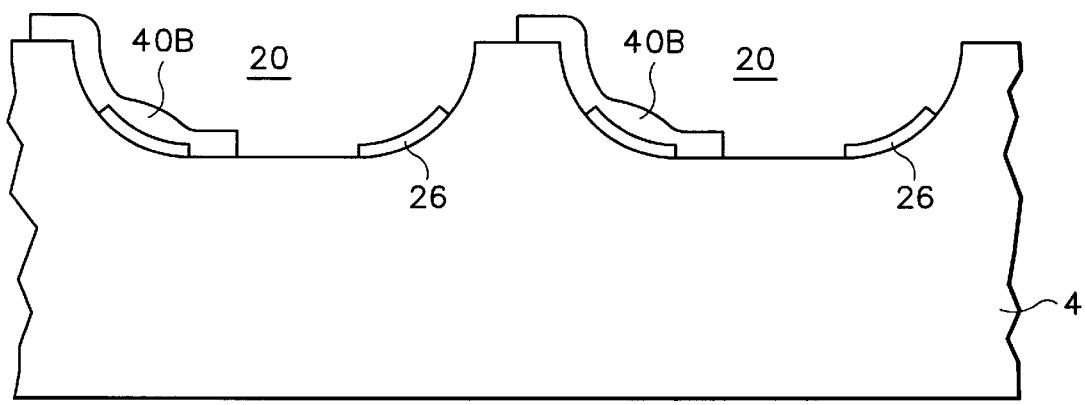
Figure 3:
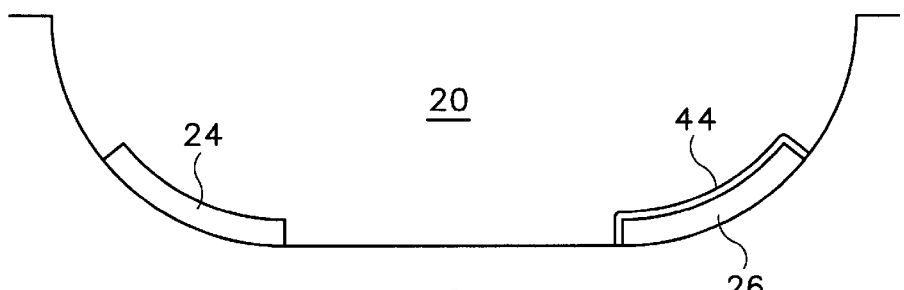
Figure 4:
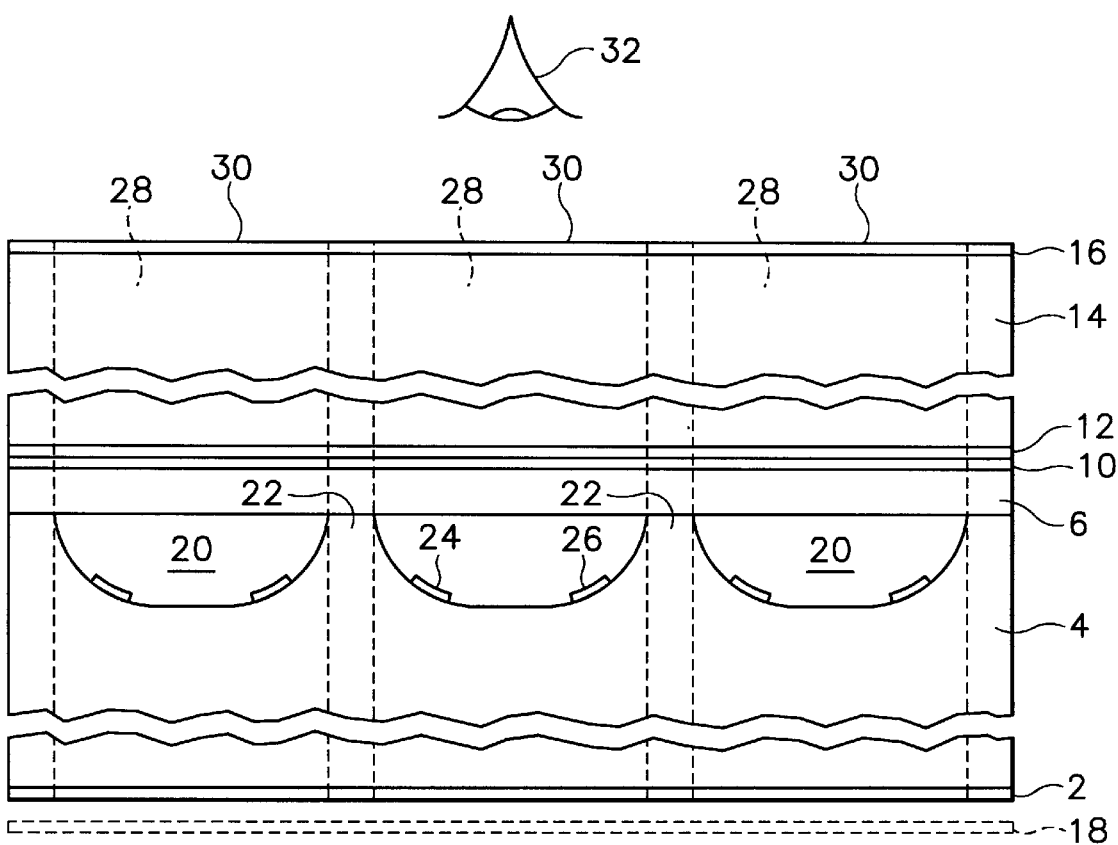
FIG. 4 is a sectional view of a PALC display panel in accordance with the prior art.

Referring to FIG. 1, a blanket layer 40 of photoresist material is deposited over the upper surface of the channel member 4 and is image-wise exposed in accordance with a pattern of stripes, wherein alternate stripes of the pattern lie over the anodes and the cathodes respectively. The nature of the pattern and the nature of the photoresist material (positive or negative) are such that stripes 40A of photoresist material over the cathodes can be readily removed while stripes 40B over the anodes remain in place. The stripes 40A of the photoresist material over the cathodes are removed, exposing the cathodes, while the stripes 40B over the anodes mask the anodes (FIG. 2). The channel member is placed in an electrophoretic deposition cell adapted for cataphoretic deposition of $LaB_6$ and the cathodes of the channel member are connected to the negative terminal of the cataphoretic deposition voltage source. A coating 44 (FIG. 3) of $LaB_6$ is thereby formed on the exposed cathodes. Some $LaB_6$ may also be deposited on other portions of the channel member, and particularly on the stripes 40B of photoresist material that mask the anodes, but none is deposited directly on the anodes because they are masked by the photoresist material. In order to minimize deposition of $LaB_6$ on the photoresist material that masks the anodes, it is preferred that the anodes be out of the cataphoretic deposition circuit or be connected to a terminal that is biased positive relative to the negative terminal of the cataphoretic deposition voltage source. The channel member is removed from the cataphoretic deposition cell and the stripes 40B of photoresist material are stripped to expose the anodes and remove any LaB6 deposited on the stripes 40B.

Typically, the electrodes in a given channel have a width of about 50 μm and are at a spacing or gap of at least about 100 μm. If the locations of the stripes 40A and 40B are defined within a tolerance of about +/−30 μm and the width of the stripes are defined within a tolerance of about +/−30 μm, it is possible to ensure with a high degree of reliability that the cathodes will be fully exposed by removal of the stripes 40A and the anodes will be fully covered by the stripes 40B. These tolerances in width and location of the stripes are within the capabilities of current photolithographic processes.

It will be appreciated that the invention is not restricted to the particular embodiment that has been described, and that variations may be made therein without departing from the scope of the invention as defined in the appended claims and equivalents thereof. For example, the invention is not restricted to use in applying a coating to the cathodes and not to the anodes and may be used instead in applying a coating to the anodes and not to the cathodes. In this case, the nature of the pattern and the nature of the photoresist are such that the stripes 40B of photoresist material can be readily removed while the stripes 40A remain in place. Furthermore, the invention may be used in applying a coating of a first material to a first set of electrodes, such as the anodes, and a coating of a second material to a second set of electrodes, such as the cathodes, in which case a first blanket layer of photoresist material is applied, patterned and partially removed to expose the first set of electrodes, a coating of the first material is applied to the first set of electrodes, and the remaining stripes of the first blanket layer are stripped; and then a second blanket layer of photoresist material is applied, patterned and partially removed to expose the second set of electrodes, a coating of the second material is applied to the second set of electrodes, and the remaining stripes of the second blanket layer are stripped.

We claim:

1. A method of fabricating a channel structure for a PALC panel, comprising:

(a) providing a channel member having a plurality of channels formed in its upper surface and having at least two electrodes in each channel, each electrode having an exposed surface, (b) masking the exposed surface of at least one electrode in each channel while leaving the exposed surface of at least one other electrode unmasked, (c) electro-depositing inorganic material on the exposed surface of said other electrode in each channel, and (d) removing the mask from said one electrode in each channel.

2. A method according to claim 1, wherein the channel member has only two electrodes in each channel and step (b) comprises masking the exposed surface of one of the two electrodes in each channel while leaving the exposed surface of the other of the two electrodes unmasked.

3. A method according to claim 1, wherein step (c) comprises exposing the exposed surface of said other electrode and the mask to deposit of material.

4. A method according to claim 1, wherein step (c) comprises depositing said material by cataphoretic deposition.

5. A method according to claim 4, wherein step (c) comprises connecting said other electrode in each channel to a negative terminal of a cataphoretic deposition voltage source and holding said one electrode in each channel out of circuit.

6. A method according to claim 4, comprising connecting said other electrode in each channel to a negative terminal of a cataphoretic deposition voltage source and connecting said one electrode in each channel to a terminal that is biased positive relative to said negative terminal.

7. A method according to claim 1, wherein step (b) comprises applying a photosensitive mask material to the entire upper surface of the channel member, image-wise exposing the mask material to actinic radiation, whereby portions of the mask material over said other electrode are rendered readily removable upon exposure to a selected removal agent while portions of the mask material over said one electrode are rendered resistant to removal, and exposing the mask material to said selected removal agent.

8. A channel structure for a PALC panel, manufactured by a method according to claim 1.

* * * * *